Jan. 14, 1958   J. D. LANGDON   2,819,750
ADJUSTABLE TIRES

Filed Feb. 12, 1953   2 Sheets-Sheet 1

INVENTOR

J. D. Langdon

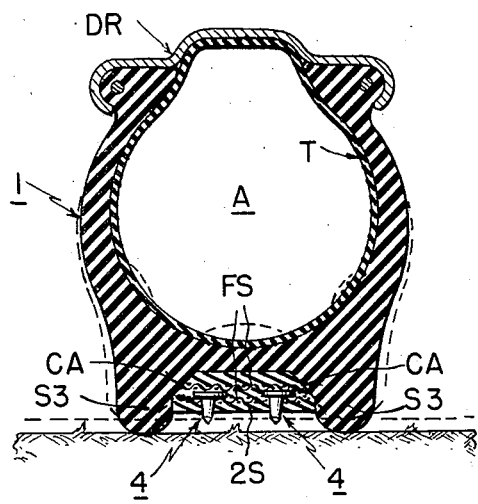
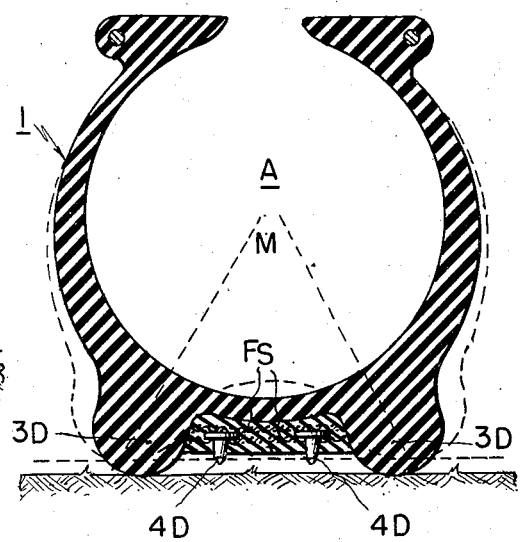
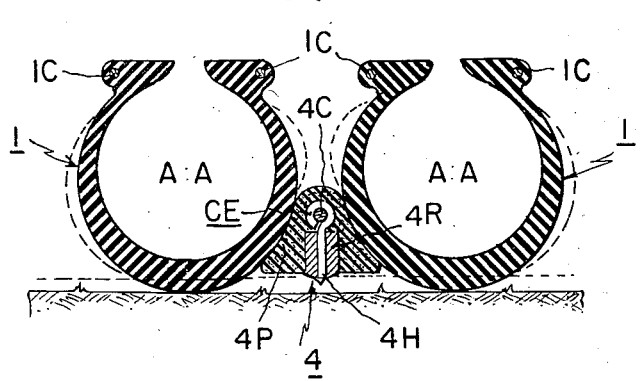
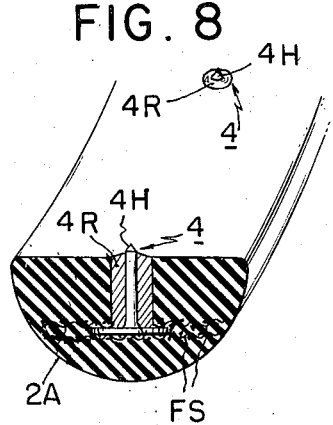
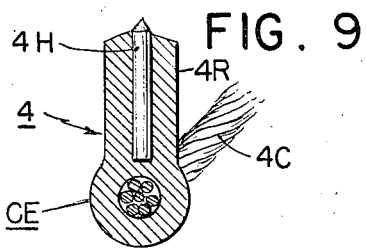

United States Patent Office 2,819,750
Patented Jan. 14, 1958

2,819,750

ADJUSTABLE TIRES

Jesse D. Langdon, Long Beach, Calif.

Application February 12, 1953, Serial No. 336,588

8 Claims. (Cl. 152—176)

This application is a continuation in part of Ser. No. 91,590 filed May 5, 1949 now Pat. 2,650,632 for Adjustable Tires, and shows several improved forms in the shape of additional species of adjustable pneumatic tires having retractable non-skid tread means using the basic principle of utilizing a change of pneumatic pressure to adjust the contact area of the tread means against a road surface according to the state of tire inflation; by providing a chief tread for constant contact with a road surface, normally protruding beyond secondary auxiliary tread means held out of contact with the road by and adapted to supplement the chief tread means and contact the road surface when the tire is suitably deflated.

The primary purpose of the herein invention is to teach improved forms of reduction to practice to enable those versed in the art to devise and build various forms of the invention to meet exigencies of use under a wide range of conditions.

Another object is to provide retractable calks or claws, made of relatively hard segments of material with prehensile qualities, by imbedding, anchoring and securing same in a cushion of resilient rubber-like material, whereby pressure against the material will expose the hard segments, calks or claws.

A further object is to minimize the breaking down of the resilient material surrounding the calks or claws by providing a suitable securing and anchoring means for said calks or claws.

A still further object is to provide a removable and replacable tread for the tire combined with metal segments in the form of self sharpening calks or claws.

Other and further objects will appear in the following specification as illustrated by the drawings showing several forms of reduction to practice used for purpose of illustration only it being specifically understood that reduction to practice shown may be changed within the scope of the claims.

The drawings are diagrammatic, of which:

Fig. 3 is a transverse section of another form of the invention depicting a species wherein tire being fully inflated, the load is normally carried on a pair of relatively narrow chief, constant contact tread surfaces S3—S3 forming chief tread means projecting radially outwardly either side of auxiliary tread means lying in a median groove between CA—CA. Broken lines substantially show deformation contour under load when tire is partially deflated.

Fig. 4 shows a species of the invention as the tire would appear partially deflated under load stress as shown by broken lines; wherein the constant contact chief tread means consist of ridges formed by two parallel pneumatic tires shown in cross section.

Fig. 5 is another form species as of Fig. 3 wherein the chief or constant tread means is formed by deformable portions projecting at divergent angles.

Figure 1:
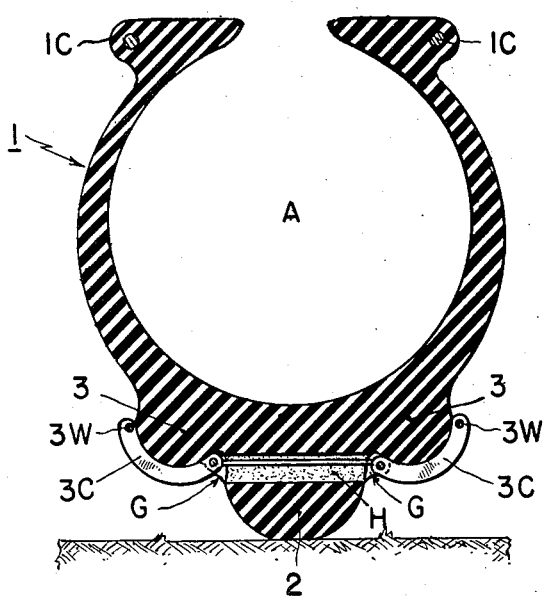
Fig. 1 is a transverse section of one species of adjustable pneumatic tire illustrating a median chief tread normally protruding beyond secondary tread means bordering both sides of the chief tread, the second tread means provided with removable auxiliary cleats, the pneumatic tire being shown as fully inflated.
Figure 6:
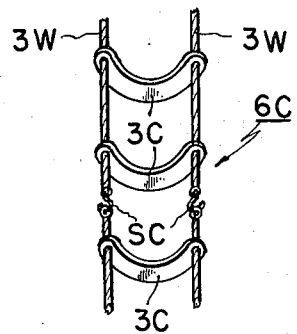
Figure 2:
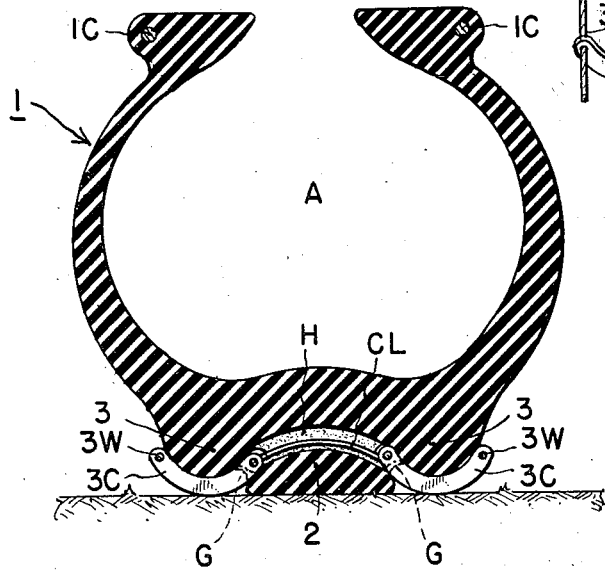
Fig. 2 shows substantially the same species of tire as Fig. 1, as it would appear under a lower state of inflation under load stress, permitting cleated metal portions 3C—3C anchored concomitant deformable material to contact a road surface.

Fig. 6 is a plan view of a fragmentary portion of a form of removable cleated chain of metal segments for combination as depicted by Figs. 1 and 2.

Figure 7:
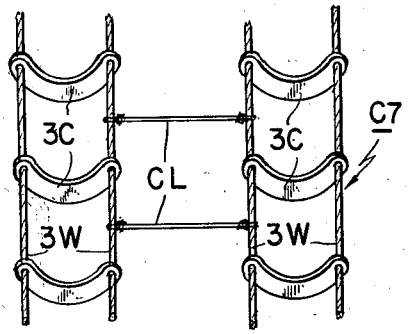

Fig. 7 is an alternative form as of Fig. 6 wherein cleat cables 3W—3W are transversely connected by links CL forming assembly C7.

Fig. 8 is a sectional elevation of a fragment of a preferable form of resilient band incorporating integrated metal segments in the form of retractable prehensile calks or claws.

Fig. 9 shows segment elements in form of calks 4—4H—4R provided with eyelet means having a cable or wire 4C inserted therethru.

Like numerals indicate like elements thruout all figures of the drawing; letters being included with numerals to indicate different forms of equivalent elements.

The following is a list of designating characters indicating various elements of the invention:

Figs. 1 and 2:

1, pneumatic tire carcass, having air space A, Figs. 1, 2, 3 and 5
1C, rim cable, conventional reinforcement
2, chief tread formed by median ridge, Figs. 1 and 2
3—3, shoulders forming auxiliary or secondary tread, Figs. 1 and 2
3C, cleats formed by metal segments, Figs. 1, 2, 6 and 7
Link means joining cleats transversely, Figs. 1, 2 and 7
H, holes or openings thru chief tread 2, Figs. 1 and 2
G, grooves accommodating cable between chief and auxiliary tread means, Figs. 1 and 2
3W, wire or cable joining segments 3C, Figs. 1, 2, 6 and 7

Fig. 3:

DR, tire rim
CA, groove or recess angles corresponding with shape of band 2S, Fig. 3
2S, center band or strip forming auxiliary or second tread
S3, ridges forming chief tread
4, entire calk formed by metal segments, Figs. 3, 4, 5, 8 and 9
T, inner tube
FS, fabric strips, Figs. 3, 5 and 8

Fig. 4:

1, conventional tire carcass and air chambers AA
4, entire calk
4P, central strip pad or band forming secondary tread means
4C, cable for calk eyelet as of Fig. 9
CE, eyelet for cable calk assembly 4
4H, hard core
4R, portion made of material softer than core 4H

Fig. 5:

3D—3D, ridges, chief or constant tread means
M, median line of ridges 3D—3D
4D—4D, metal calked band or pad forming secondary tread

Fig. 6:

6C, chain assembly, cleats 3C—3C—3C, cables or wire 3W—3W, coupling SC

Fig. 7:

C7, enchained cleats, cleats 3C—3C, 3W—3W cables or wires, CL cross links.

Fig. 8:

2A, band or pad, 4 calks, 4H—4H hard core, 4R softer calk material, band 2A comprising calk means 4—4H—4R with fabric FS included

Fig. 9:

4, entire calk, 4C cable, CE calk eyelet, 4H hard core, CE cable eyelet, 4C cable soft metal, 4R surrounding hard calk portion 4H Fig. 1 illustrates a form of reduction to practice including disclosure common to original parent Pat. 2,650,632, Sept. 1, 1953; wherein a median ridge 2 is shown as making constant contact with a road surface and serving the purpose of a chief tread 2 normally projecting radially outward and forwardly of two shoulders 3—3 forming auxiliary tread means normally held out of contact with the road surface by said chief tread.

Generically the original patent and present application both show species of pneumatic tires having chief tread means normally projecting and protruding a substantial distance radially beyond paralleled auxiliary or secondary tread means; whereby the chief tread will constantly contact a road surface supporting the secondary tread out of contact with a road bed, both treads contacting the road surface when tire is suitably deflated under a lowered pressure adjustment.

Instant Fig. 1 shows auxiliary tread means 3—3 surmounted by removable, enchained metal segments forming cleat means 3C—3C normally held out of contact with the road surface by chief tread 2 when the tire is fully inflated. Grooves G—G are preferably provided circumscribing the tire between chief tread 2 and shoulders 3—3 forming the secondary tread means.

Holes or channels may be formed transversely thru chief tread 2 at suitable intervals around the tire to accommodate transverse link means CL interconnecting cables 3W and cleats 3C in position as shown. In case grooves G—G are not provided this arrangement will prevent cleats 3C—3C from slipping laterally out of place. Cables or wires 3W—3W may serve to interconnect and prevent lateral slippage of cleats 3C—3C when grooves G—G are provided.

Fig. 2 shows an approximate deformation of tire 1 and chief tread means 2 when adjusted under partial state of deflation whereby chief tread 2 is flattened and spread, binding the cable and inner portions of the cleats in position within grooves G—G depressing the outer circumference of air or pneumatic chamber A inwardly at point of road contact to conform with changing position of chief tread 2 in accordance with reduced pressure adjustment in chamber A, thus permitting metal segments forming cleats 3C—3C to contact the road surface and supplement chief tread means 2.

It will therefore be seen that the prehensile qualities of segments 3C—3C are controlled by pneumatic pressure adjustment, a greater pressure within the tire causing the cleats 3C—3C to be withdrawn from contact with a road surface as per Fig. 1.

Fig. 3 shows another species of the invention wherein shoulders or ridges S3—S3 paralleling auxiliary tread means 2S, are provided to form constant tread means for contacting a road surface. The central band, pad or strip 2S forms auxiliary tread means, preferably made of relatively soft rubber-like material vulcanized integral with the tire and having segments formed by flanged calks or claws 4 incorporated therein, the flanges of calks 4 are held between fabric strips FS located at that side of the auxiliary tread means proximate the pneumatic chamber. Points of metal segments formed by calks 4 preferably protrude slightly from the outer surface of strip or band 2S. The calks will be forced to protrude thru resilient material under load according to amount of weight carried by tire, thus deforming the tread accomplishing prehensile effect for calks 4, causing same to cling to a road surface. The calk form of segment is desirable on an icy surface. Band 2S may be transversely cleated as an added tractive feature in snow.

The inner surface of band 2S is wedge shaped and formed with compression angles at CA—CA, contacting and conforming with the shape of the median recess or groove between the ridges comprising constant tread means S3—S3 bordering band 2S. As air pressure in chamber A is depleted, ridges S3—S3 will recede and deform, effective against compression angles CA—CA to urge band 2S and calks 4—4 to protrude, accentuating the pressure and prehensile effect of calks 4—4 against a proximate road surface.

Fig. 4 shows a pair of tires 1—1 with twin air chambers AA—AA in lieu of equivalent ridges S3—S3 of Fig. 3 or 3D—3D of Fig. 5. Fig. 4 shows a central strip pad or band forming auxiliary tread 4P, in this instance integrated with calks 4 having hardened center core 4-H, surrounded by a portion made of relatively soft material 4R such as metal or phenolic plastic, permitting the relatively soft portion 4R to wear away faster than the harder material of core 4H, causing a relatively sharp calk point to be maintained for calks 4; furthermore, the larger diameter of portion 4R increases area of lateral bearing surface surrounding and supporting hard calk center 4H against tipping within the material forming calk pad or secondary tread 4P.

It is self evident that auxiliary or secondary tread formed by pad 4P can be placed between the chief tread formed by dual pneumatic tires as commonly used on trucks and other vehicles. Calks 4 will be permitted to impinge the road bed at such times as the dual tires are suitably adjusted by deflation.

Fig. 5 shows another modification of Figs. 3 and 4 wherein the constant contact tread means 3D—3D projects at an angle flaring away from one another, median line M shown by broken lines. The position and form of chief tread means 3D—3D causes them to spread apart more and more as tire pressure in chamber A is diminished thus contributing to urge pad and calks 4D against a road bed with prehensile effect.

Fig. 6 shows cleats 3C—3C enchained together with cable or wire means 3W—3W thus forming a chain of cleats 6C which may be dismounted from secondary tread means 3 as of Figs. 1 and 2, by deflating the tire, where chain 6C is in the form of an uninterrupted circle for annular mounting around the tire tread. Chain 6C may be provided with suitable connecting means SC for interrupting the circle to facilitate mounting the chain on the tire without deflating same. Cleat chain 6C is designed to be used concomitant with at least one auxiliary tread. The segmented form of cleat chain C7 as of Fig. 7 is provided with transverse cross links CL securing a pair of cleat chains C7 together in parallel for use where suitable openings H are provided thru chief tread 2 for securing metal segment 3C—3C integral with tire 1 as indicated by Figs. 1 and 2. With this form of chain C7 circumferential grooves G—G may be dispensed with, if desired.

Various species of the invention include segments of relatively hard material forming prehensile means of clinging to a road surface. Two types of segments are shown, the bar type as of Figs. 1, 2, 6 and 7 and the calk or claw type as of Figs. 3, 4, 5 and 8. All types of hard segments shown are retractable from the road surface due to effects of resilient relatively soft rubber-like material permitting a second tread to be withdrawn and recede from the outer plane of chief tread means as set forth by specification and drawings.

Having described construction, operation and use of the invention, the following claims are made:

1. A pneumatic tire adjustable to various road surface conditions comprising a hollow casing forming a pneumatic cavity surrounded by a wall made of elastic deformable material, a relatively narrow ridge forming a chief tread for constant contact with a road bed, secondary auxiliary tread provided with non-skid means paralleling said chief tread, same holding the secondary tread out of contact with the road surface, the tire being sufficiently inflated whereby both treads face radially outwardly and circumscribe said hollow casing and are confined to that area radially outwardly of said hollow casing that normally extends radially outwardly between the side walls of said pneumatic tire from the inside of the casing, both treads positioned to indent the tread side of the hollow casing and recede inwardly of said adjacent portions of said side-walls when the tire is suitably deflated, the aggregate transverse diameter of the cavity and sidewalls being greater than the combined width of said both treads, said secondary tread provided with rigid inserts whereby when the tire pressure is suitably adjusted by deflation, the combined area of said both treads is urged inwardly by road contact indenting that side of said cavity that is proximate said both treads, same being compressed between and effective to spread said sidewalls and expose more area to such road surfaces as loose sand, mud, snow and ice, said rigid inserts protruding from the surrounding deformable material with prehensile effect.

2. A tire of the genus as defined by claim 1 wherein the invention consists of a tire including a casing made of deformable material surrounding a cavity adapted to receive a pneumatic element of inflation, said casing having a chief tread and a secondary tread, said chief tread circumscribing said tire in a median plane and projecting radially outwardly a substantial distance beyond the circumferential surface of said secondary tread for contacting a road surface independently of said seconday tread, said secondary tread comprising shoulders paralleling and extending laterally of said chief tread and tapering radially thinner toward the median plane to form with said chief tread clearance spaces circumscribing the tire either side of said chief tread and to permit said chief tread to circumferentially recede radially inwardly and said secondary tread to move radially outwardly on deflation of said tire, wherein the secondary tire is provided with metal segments enchained together circumferentially and tied together transversely thru opening provided thru said chief tread.

3. A tire of the genus as defined by claim 1 forming a multiple treaded pneumatic tire made of deformable material comprising a chief tread and a secondary tread, said chief tread circumscribing said tire in the median plane and projecting radially outwardly a substantial distance beyond the circumferential surface of said secondary tread for contacting a road surface independently of the secondary tread, said secondary tread having ribs perpendicular to said chief tread, extending laterally therefrom and tapering radially thinner toward said median plane, a clearance space formed by a groove between said chief tread and said secondary tread to permit said chief tread to circumferentially recede radially inwardly and said secondary tread to contact said road surface upon deflation of said pneumatic tire, wherein the ribs are made of rigid material secured in operative position, incorporated in resilient deformable material forming the secondary tread of the tire.

4. An adjustable tire as defined by claim 1, wherein the chief tread means is formed by two parallel ridges forming the narrow ridge means and the auxiliary tread is interspersed between the two ridges, the rigid inserts being formed by calk means having an inner end embedded and anchored in the auxiliary tread, same made of resilient material permitting said calk means to protrude when the material is compressed.

5. An adjustable tire as defined by claim 4, wherein the ridges flare away from one another, their median lines converging toward the median line of the tire cavity, whereby the ridges are urged apart under load to permit the auxiliary tread to move into road contact.

6. An adjustable tire as of claim 4, wherein the narrow ridges are formed by the apsides of dual pneumatic tires and the auxiliary tread is formed by a strip of deformable material configurated to fit between and be supported by and between the dual tires.

7. A tire as defined by claim 6 wherein the calk anchoring means consists of cable means extended thru eyelet means formed by the embedded end of the calk means.

8. For use with an adjustable tire as defined by claim 4, an elastic band of deformable material molded with flanged calk means incorporated in said band, the flange secured together with fabric molded integral with said band, the sharp end of said calk means normally protruding from the inside of the band whereby when the band is reversed by being turned inside out the material of the inside of the band is tensioned and the outside is compressed for insertion between two ridges.

References Cited in the file of this patent

UNITED STATES PATENTS

| | | |
|---|---|---|
| 738,064 | Prinzhorn | Sept. 1, 1903 |
| 922,631 | Reddaway | May 25, 1909 |
| 956,928 | Bonnet | May 3, 1910 |
| 1,127,789 | McCoy | Feb. 9, 1915 |
| 2,130,524 | Clark | Sept. 20, 1938 |
| 2,235,375 | Kraft | Mar. 18, 1941 |
| 2,480,548 | Carhart | Aug. 30, 1949 |